United States Patent
Kim

(10) Patent No.: US 7,861,371 B2
(45) Date of Patent: Jan. 4, 2011

(54) DOOR DAMPER

(75) Inventor: Jaehong Kim, Seoul (KR)

(73) Assignee: Moonju Hardware Co., Ltd, Incheon (KR)

( * ) Notice: Subject to any disclaimer, the term of this patent is extended or adjusted under 35 U.S.C. 154(b) by 328 days.

(21) Appl. No.: 12/084,385

(22) PCT Filed: Sep. 7, 2007

(86) PCT No.: PCT/KR2007/004333
§ 371 (c)(1),
(2), (4) Date: Apr. 30, 2008

(87) PCT Pub. No.: WO2009/031723
PCT Pub. Date: Mar. 12, 2009

(65) Prior Publication Data
US 2010/0170062 A1 Jul. 8, 2010

(51) Int. Cl.
*E05F 5/06* (2006.01)
(52) U.S. Cl. ........................ 16/85; 16/82; 16/52; 16/54; 16/58; 16/DIG. 10; 16/DIG. 21
(58) Field of Classification Search ............... 16/85, 16/84, 82, 72, 49, 51, 52, 54, 58, 66, 68, 16/50, DIG. 9, DIG. 10, 17, DIG. 21
See application file for complete search history.

(56) References Cited

U.S. PATENT DOCUMENTS

| | | | | |
|---|---|---|---|---|
| 3,714,677 A * | 2/1973 | Schmid | ......................... | 16/62 |
| 4,102,004 A * | 7/1978 | Nagase | ......................... | 16/49 |
| 4,155,144 A * | 5/1979 | Koganei | ......................... | 16/54 |
| 4,785,493 A * | 11/1988 | Tillmann et al. | ............... | 16/53 |
| 4,825,503 A * | 5/1989 | Shiramasa et al. | ............ | 16/52 |
| 4,847,946 A * | 7/1989 | Nam et al. | ..................... | 16/53 |
| 4,937,913 A * | 7/1990 | Jentsch | ......................... | 16/58 |
| 6,442,795 B1 * | 9/2002 | Chen | ............................. | 16/53 |
| 6,957,807 B2 * | 10/2005 | Zimmer et al. | ........... | 267/64.11 |

* cited by examiner

*Primary Examiner*—William L. Miller
(74) *Attorney, Agent, or Firm*—Staas & Halsey LLP

(57) ABSTRACT

Disclosed is a door damper, in which a safety check valve is installed in consideration of the case in which an impact exceeding a design pressure will be applied, thereby absorbing the impact to enable a door to be closed safely and smoothly. In the door damper, a safety check valve is installed in a piston, and thus is opened in cooperation with another check valve installed between a spring holder and the piston when the pressure exceeding a design pressure is applied. Thereby, when the impact exceeding the design pressure occurs, the safety check valve can absorb the impact to prevent damage. A channel can be adjusted by only ridges formed on an outer circumference of the check valve, so that productivity can be improved thanks to easy tolerance management. Further, an oil seal is not contracted or deformed in spite of long-term use.

11 Claims, 5 Drawing Sheets

[When a door is open]

[When a door is closed]

DOOR DAMPER

CROSS REFERENCE TO RELATED APPLICATIONS

This application claims the benefit under 35 U.S.C. Section 371, of PCT International Application Number PCT/KR2007/004333, filed Sep. 7, 2007, the contents of which are incorporated herein by reference.

TECHNICAL FIELD

The present invention relates to a door damper and, more particularly, to a door damper in which a safety check valve is installed in consideration of the case in which an impact exceeding a design pressure will be applied, thereby absorbing the impact to enable a door to be closed safely and smoothly.

BACKGROUND ART

In general, doors are attached to household furniture such as a wardrobe, bookcase, etc. or a kitchen cabinet by spring hinges so as to be able to be easily opened and closed with weak force. When closed, the door bumps against a doorframe, so that there is a possibility of causing noise or accident.

Particularly, when carelessly abruptly closing the door, a child is injured in the finger, which is pinched between the doorframe and the door.

In order to overcome this problem, a door damper as illustrated in FIG. 9 has been developed.

This door damper is designed to use a check valve to rapidly close the door by increasing the cross section of a channel through which oil, in an oil chamber, passes when an impact is weak, and to absorb the impact by narrowing the channel cross section when the impact is strong.

DISCLOSURE

Technical Problem

Such a door damper has the following problems since the impact is absorbed only by restricting a flow of the oil using the check valve.

(1) The door damper is easily damaged when the impact exceeding a design pressure occurs.

(2) The door damper is abnormally operated since it is difficult to manage a tolerance of the check valve.

(3) The oil can leak out since an oil seal is deteriorated with the lapse of time.

Technical Solution

Accordingly, in order to solve the problems occurring in the related art, the present invention provides a door damper, which comprises: a cylindrical body, which is open on one side thereof, and has a bumper on the other side thereof; a return spring, which is inserted into the body; a spring holder, which supports the return spring; a piston, which is inserted into the spring holder; a check valve, which is installed between the spring holder and the piston; a piston rod, which is coupled to one side of the piston, and protrudes outside the body; an oil distributor, which has the piston rod passing therethrough, and is in contact with the piston; a sponge, which is in contact with the oil distributor, has the piston rod passing therethrough, and is fixed to a bushing; and a cover, which covers one side of the body together with the oil seal contacting the bushing. Here, the piston is provided therein with a safety check valve, which is opened in cooperation with the check valve installed between the spring holder and the piston when a pressure exceeding a design pressure is applied.

Advantageous Effects

As described above, according to the present invention, the door damper has the following advantages:

(1) When the impact exceeding the design pressure occurs, the safety check valve can absorb the impact to prevent the door damper from being damaged.

(2) The channel can be adjusted by only the ridges formed on the outer circumference of the check valve, so that productivity can be improved thanks to easy tolerance management.

(3) The oil seal is not contracted or leaked in spite of long-term use.

DESCRIPTION OF REFERENCE NUMBERS OF MAIN PARTS IN DRAWINGS

Figure 1:
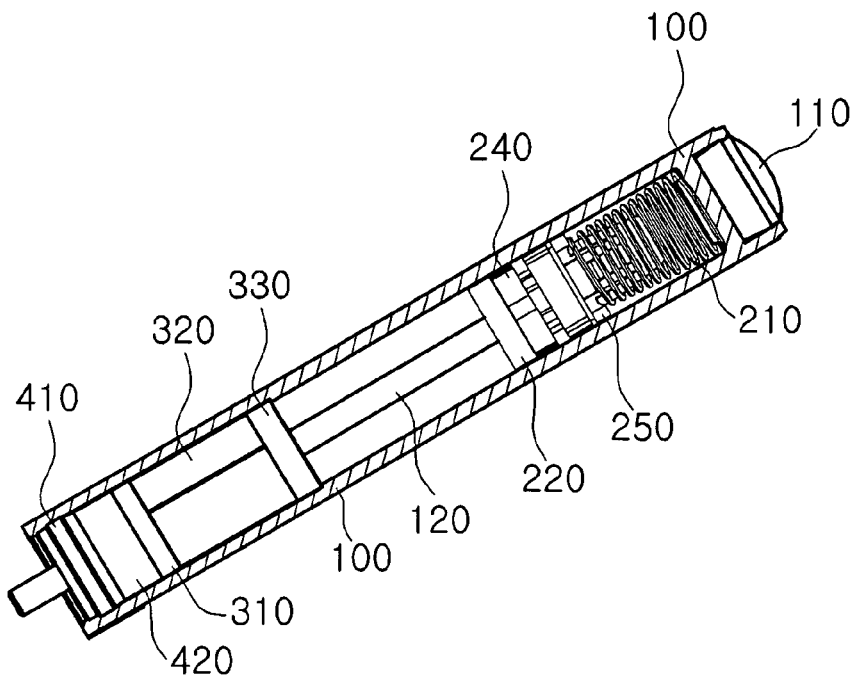
FIG. 1 is a perspective view illustrating a door damper according to an exemplary embodiment of the present invention.
Figure 2:
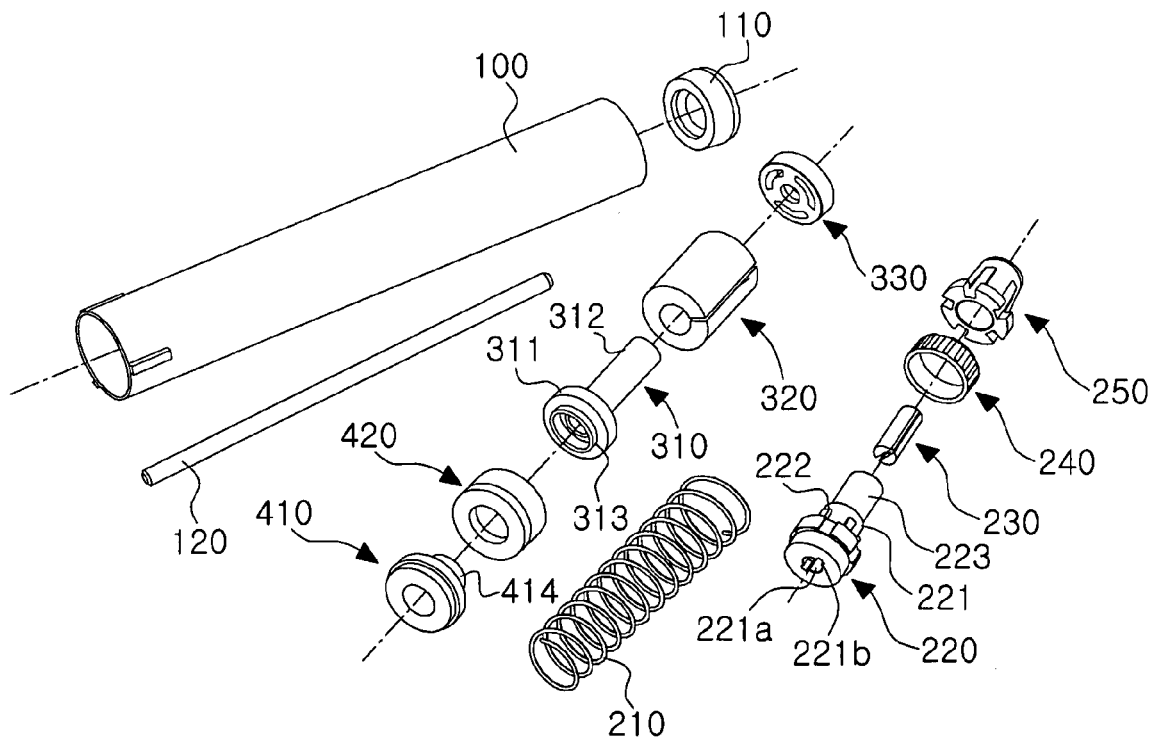
FIG. 2 is an exploded perspective view illustrating a door damper according to an exemplary embodiment of the present invention.
Figure 3:
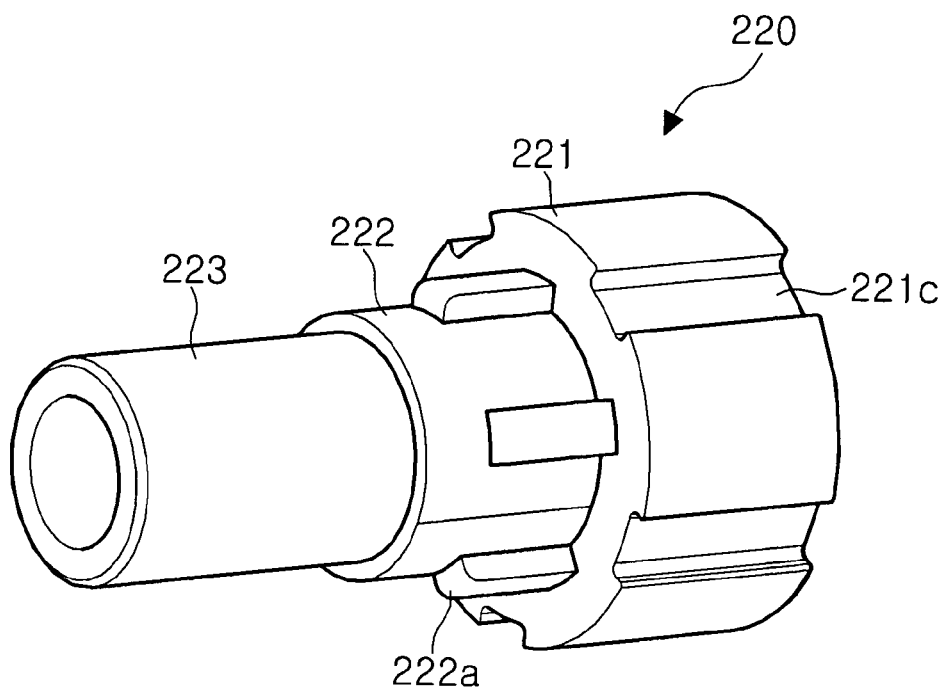
FIG. 3 is a perspective view illustrating a piston for a door damper according to an exemplary embodiment of the present invention.
Figure 4:
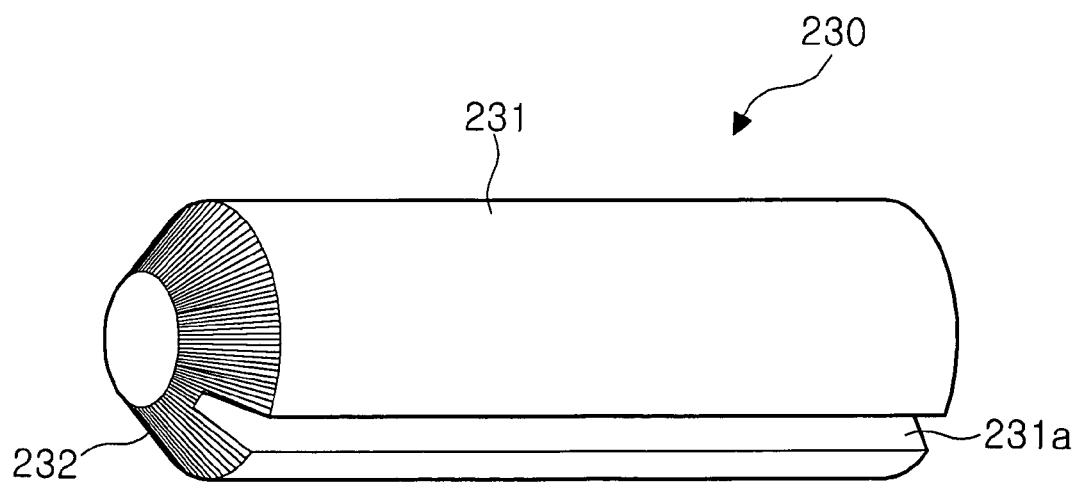
FIG. 4 is a perspective view illustrating a safety check valve for a door damper according to an exemplary embodiment of the present invention.

| | |
|---|---|
| 100: body | 110: bumper |
| 120: rod | 210: return spring |
| 220: piston | 230: safety check valve |
| 240: check valve | 250: spring holder |
| 310: bushing | 320: sponge |
| 330: oil distributor | 410: cover |
| 420: oil seal | |

MODE FOR INVENTION

Referring to FIGS. 1 through 8, a door damper of the present invention comprises: a cylindrical body 100, which is open on one side thereof, and has a bumper 110 on the other side thereof; a return spring 210, which is inserted into the body 100; a spring holder 250, which supports the return spring 210; a piston 220, which is inserted into the spring holder 250; a check valve 240, which is installed between the spring holder 250 and the piston 220; a piston rod 120, which is coupled to one side of the piston 220, and protrudes outside the body; an oil distributor 330, which has the piston rod 120 passing therethrough, and is in contact with the piston 220; a sponge 320, which is in contact with the oil distributor 330, has the piston rod 120 passing therethrough, and is fixed to a bushing 310; and a cover 410, which covers one side of the body together with the oil seal 420 contacting the bushing 310. Here, the piston 220 is provided therein with a safety check valve 230, which is opened in cooperation with the check valve 240 installed between the spring holder 250 and the piston 220 when a pressure exceeding a design pressure is applied.

The piston 220 is a cylinder in the middle of which a hole is formed, and is provided with a piston body 221 at an upper portion thereof, an operating body 222 formed integrally with the piston body 221 and having an outer diameter less than that of the piston body 221, and an inserting body 223 formed integrally with the operating body 222 and having an outer diameter less than that of the operating body 222.

The piston body 221 is provided with a rod inserting hole 221a at an upper end thereof, which communicates with holes in the operating and inserting bodies 222 and 223 with a diameter difference.

The piston body 221 includes at least one safety channel groove 221b formed around the rod inserting hole 221a.

The piston body 221 includes a plurality of channel slots 221c in an outer circumference thereof, through which oil flows when operated. The number of channel slots 221c preferably is 4 through 8.

The operating body 222 includes a plurality of projections 222a, each of which protrudes from an outer circumference of the operating body 222 between two adjacent channel slots 221c. The number of the projections 222a is smaller than that of channel slots by one.

The safety check valve 230 is inserted into the inserting body 223, and the spring holder 250 is inserted around the inserting body 223. Thereby, the inserting body 223 and one end of the safety check valve 230 are surrounded by the spring holder 250.

The safety check valve 230 is formed of material having strong elasticity, and includes a cylindrical valve body 231, in an outer circumference of which an open slot 231a is formed in a longitudinal direction, and an operating head 232 that is formed in a truncated cone shape at one end of the valve body 231.

Figure 5:
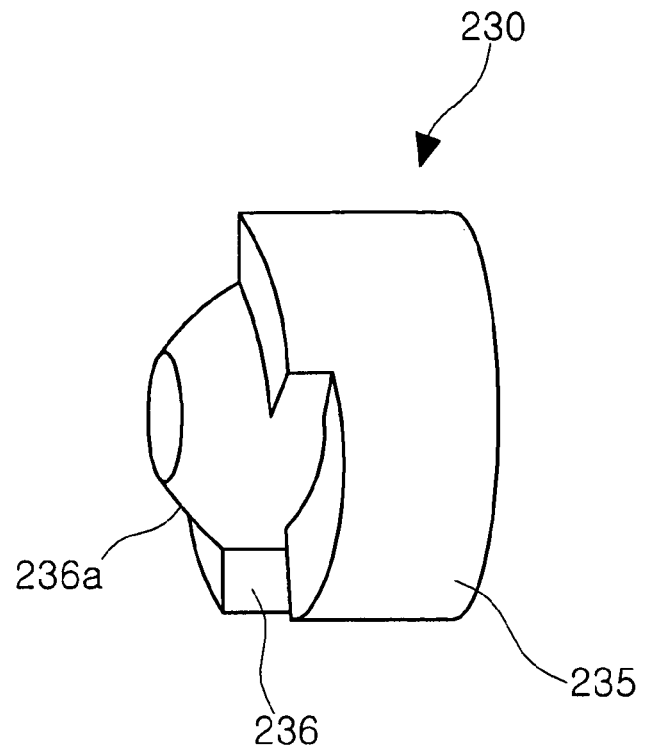
FIG. 5 is a perspective view illustrating another safety check valve for a door damper according to an exemplary embodiment of the present invention.
Figure 6:
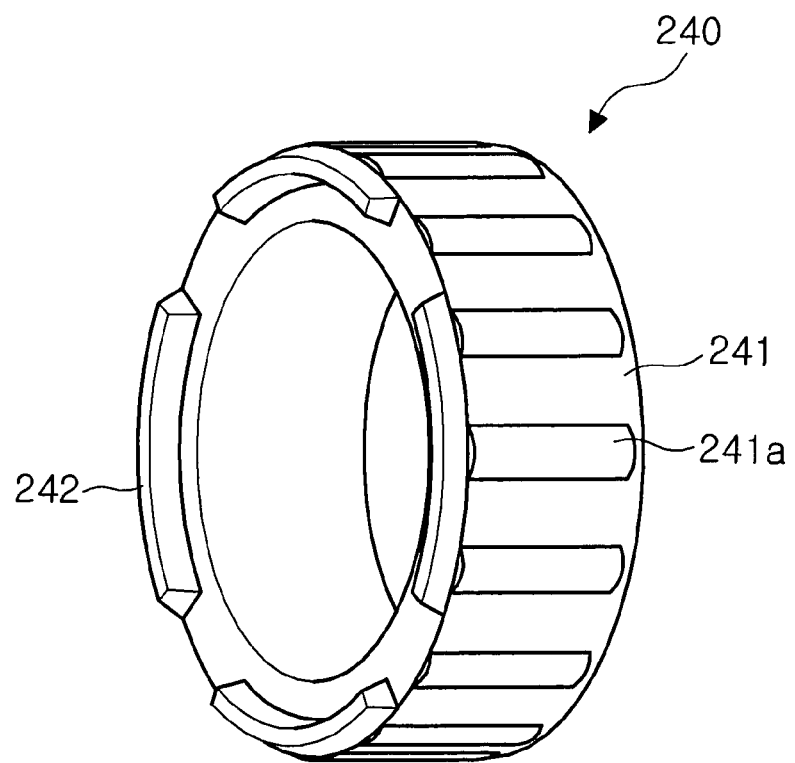
FIG. 6 is a perspective view illustrating a check valve for a door damper according to an exemplary embodiment of the present invention.
Figure 7:
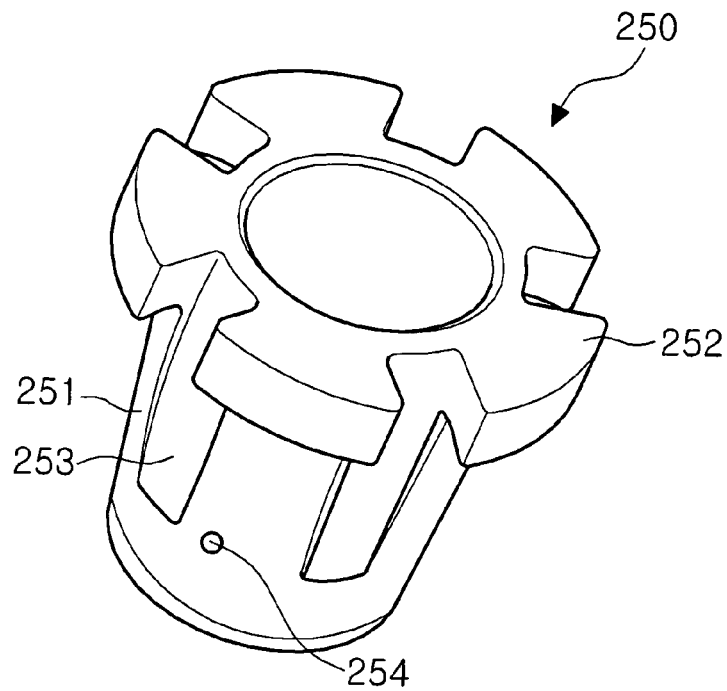
FIG. 7 is a perspective view illustrating a spring holder for a door damper according to an exemplary embodiment of the present invention.
Figure 8:
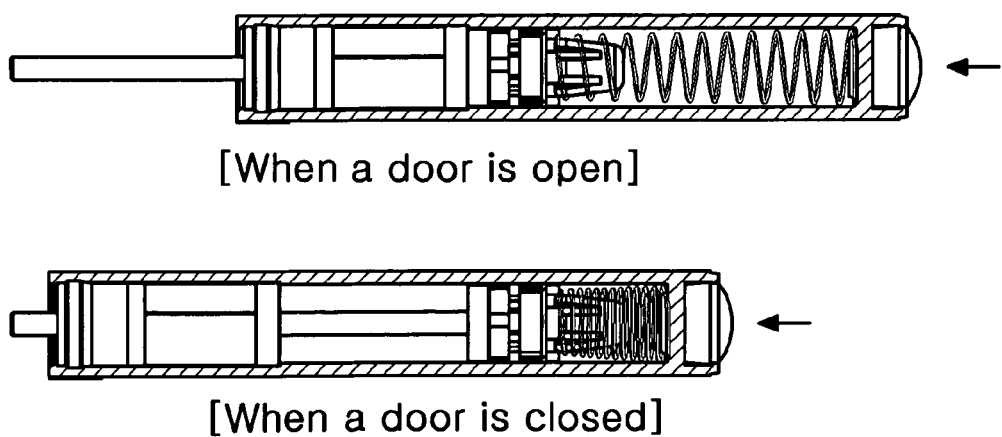
FIG. 8 is a conceptual view illustrating the operation of a door damper according to an exemplary embodiment of the present invention.
Figure 9:
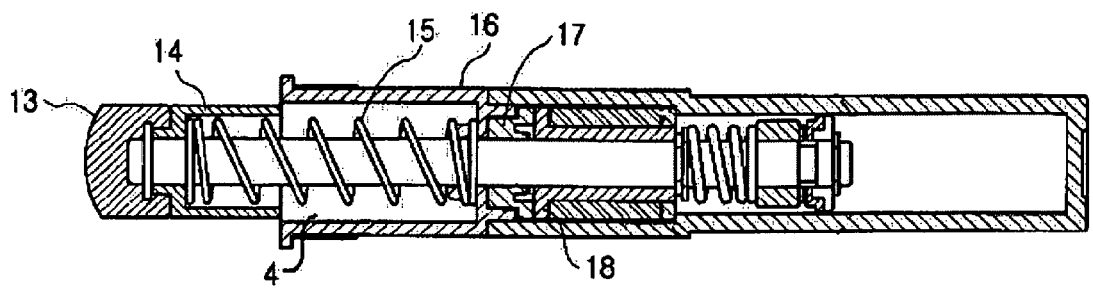
FIG. 9 is a cross-sectional view illustrating a known door damper.

As in FIG. 5, another example of the safety check valve 230 includes a cylindrical body 235, which is integrally formed with one end of the inserting body 223 of the piston 200 and has a hole so as to be able to communicate with the hole of the inserting body 223, and an operating head 236, which has an operating part 236a extending from the body 235 in a truncated cone shape in which opposite radial sides thereof are partially cut out to communicate with the hole of the body 235.

The spring holder 250 includes a cylindrical holder body 251, which is inclined toward a front end thereof which is open and has a pressure adjusting hole 254 adjacent to a rear end thereof, a plurality of ribs 252, which protrudes from the front open end of the holder body 251 in a radial direction, and a plurality of holder channel slots 253, each of which is grooved in an outer circumference of the holder body 251 between the two adjacent ribs 252.

The pressure adjusting hole 254 of the holder body 251 is closed by the operating head 232 or the operating part 236a of the safety check valve 230. As for the operation of the pressure adjusting hole 254, when an impact exceeding design pressure is applied in a completely closed state, the oil pushes the operating head 232 or the operating part 236a of the safety check valve 230 to flow out through the open slot 231a or the interior of the body 235 of the safety check valve 230.

A pressure limit is set depending on a size of the pressure adjusting hole 254. When the size of the pressure adjusting hole 254 is increased, resistible pressure limit is decreased. In contrast, when the size of the pressure adjusting hole 254 is decreased, resistible pressure limit is increased. The design pressure refers to pressure that can be absorbed by the check valve. If the pressure limit exceeds the design pressure, the safety check valve 230 is operated.

The check valve 240 includes a check valve body 241, which has the shape of a ring so as to be displaceable between the rear of the piston body 221 of the piston 220 and the ribs 252 of the spring holder 250 and has a plurality of ridges 241a on an outer circumference thereof, and a plurality of channel forming protrusions 242, which protrude forward from the check valve body 241 to form partitions.

The ridges 241a protrude at a very low height in order to improve a problem caused by tolerance, but are formed to be able to block the channel by close contact with the inner circumference of the body 100 regardless of the tolerance when being in close contact with the inner circumference of the body 100. The design pressure can be set by adjusting the number of ridges 241a.

When an impact occurs, the check valve 240 is expanded outward by the oil introduced in a moment, thereby partially blocking the oil escaping through the channel slots 221c of the piston 220. As a result, the impact can be absorbed.

The bushing 310 is inserted into the sponge 320. The oil distributor 330 is coupled to one end of the bushing 310 at one end of the sponge 320.

The bushing 310 has a hole in the middle thereof, and includes a cylindrical front body 311, a guide body 312 in the rear of the cylindrical front body 311, and a seal fixing ring 313 protruding forward from the front body 311.

The seal fixing ring 313 supports the interior of the oil seal 420, so that it prevents the oil seal 420 from being contracted in spite of long-term use.

The cover 410 has a hole in the middle thereof, and has a cylindrical shape so as not only to close the rear end of the body 100 in engagement with the body 100 on an outer circumference thereof but also support the front of the oil seal 420. Further, the cover 410 has a cover protrusion step 414 protruding backwards.

As describe above, the oil seal 420 is not contracted thanks to the seal fixing ring 313 of the bushing 310 and the cover protrusion step 414, which are inserted into the oil seal at the front and rear of the oil seal 420 respectively.

Hereinafter, the operation of a door damper according to an exemplary embodiment of the present invention will be described below.

The door damper of the present invention is mounted on the frame or hinge of a door through its case. when a door is opened, the return spring 210 returns to push the piston 220, the oil flows to the holder channel slots 253, passes between the ridges 241a of the check valve 240, and goes past the projections 222a of the piston 220, and then through the channel slots 221c.

When the door is closed, the oil flows in the opposite way to the abovementioned direction. If the door is abruptly closed (within the design pressure), the check valve 240 is expanded to lower a height of each ridge 241a. Thereby, the oil flowing along the outer circumference of the check valve 240 is nearly blocked by the ridges 241a having the low height. The channel forming protrusions 242 in front of the check valve 240 strongly come into close contact with the rear of the piston body 221, so that the channel can be narrowed to relieve an impact.

If the door is closed with a pressure limit exceeding the design pressure, the check valve 240 is expanded, and the operating head 232 or the operating part 236a of the safety check valve 230 is pushed. Thereby, the oil flows from the holder channel slots 253 into the spring holder 250 and the piston 220, and then flows out of the safety channel groove 221b, so that the pressure within the pressure limit can be withstood.

Although exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A door damper comprising: a cylindrical body, which is open on a first side thereof and has a bumper on a second side side thereof; a return spring, which is inserted into the body; a spring holder, which supports the return spring; a piston, which is inserted into the spring holder; a check valve, which is installed between the spring holder and the piston; a piston rod, which is coupled to one side of the piston and protrudes outside the body; an oil distributor, which has the piston rod passing therethrough and is in contact with the piston; a sponge, which is in contact with the oil distributor, has the piston rod passing therethrough, and is fixed to a bushing; and a cover, which covers the first side of the body together with an oil seal contacting the bushing, wherein the piston includes a safety check valve therein, which is opened in cooperation with the check valve installed between the spring holder and the piston when a pressure higher than a design pressure is applied.

2. The door damper according to claim 1, wherein the piston has a shape of a cylinder in which a hole is formed, and includes a piston body at an upper portion thereof, an operating body formed integrally with the piston body and having an outer diameter less than that of the piston body, and an inserting body formed integrally with the operating body and having an outer diameter less than that of the operating body.

3. The door damper according to claim 2, wherein the piston body includes a rod inserting hole at an upper end thereof, and at least one safety channel groove formed around the rod inserting hole.

4. The door damper according to claim 3, wherein the piston body includes four through eight channel slots in an outer circumference thereof.

5. The door damper according to claim 2, wherein the piston body includes four through eight channel slots in an outer circumference thereof.

6. The door damper according to claim 1, wherein the spring holder includes: a cylindrical holder body, which is inclined toward a front end thereof which is open, and has a pressure adjusting hole adjacent to a rear end thereof; a plurality of ribs, which protrudes from the front open end of the holder body in a radial direction; and a plurality of holder channel slots, each of which is grooved in an outer circumference of the holder body between the plurality of ribs.

7. The door damper according to claim 1, wherein the check valve includes: a check valve body, which has a shape of a ring so as to be displaceable between a rear of a piston body of the piston and the plurality of ribs of the spring holder, and has at least one ridge on an outer circumference thereof; and at least one channel forming protrusion, which protrude forward from the check valve body to form partitions.

8. The door damper according to claim 1, wherein the safety check valve is made of material having strong elasticity, and includes a cylindrical valve body, in an outer circumference of which an open slot is formed in a longitudinal direction, and an operating head that is formed in a truncated cone shape at one end of the valve body.

9. The door damper according to claim 1, wherein the safety check valve includes: a cylindrical body, which is integrally formed with one end of a inserting body of the piston, and has a hole so as to be able to communicate with the hole of the inserting body; and an operating head, which has an operating part extending from the body in a truncated cone shape in which opposite radial sides thereof are partially cut out to communicate with the hole of the body.

10. The door damper according to claim 1, wherein the bushing has a hole in a middle thereof, and includes a cylindrical front body, a guide body in a rear of the cylindrical front body, and a seal fixing ring protruding forward from the front body.

11. The door damper according to claim 1, wherein the cover has a hole in a middle thereof, includes a cylindrical shape so as not only to close a rear end of the body in engagement with the body on an outer circumference thereof but also support the front of the oil seal, and a cover protrusion step that protrudes backwards.

* * * * *

UNITED STATES PATENT AND TRADEMARK OFFICE
CERTIFICATE OF CORRECTION

| | |
|---|---|
| PATENT NO. | : 7,861,371 B2 |
| APPLICATION NO. | : 12/084385 |
| DATED | : January 4, 2011 |
| INVENTOR(S) | : Jaehong Kim |

It is certified that error appears in the above-identified patent and that said Letters Patent is hereby corrected as shown below:

Column 5, Line 30 in Claim 1, after "second" delete "side".

Signed and Sealed this
Tenth Day of May, 2011

David J. Kappos
*Director of the United States Patent and Trademark Office*